Figure 1:
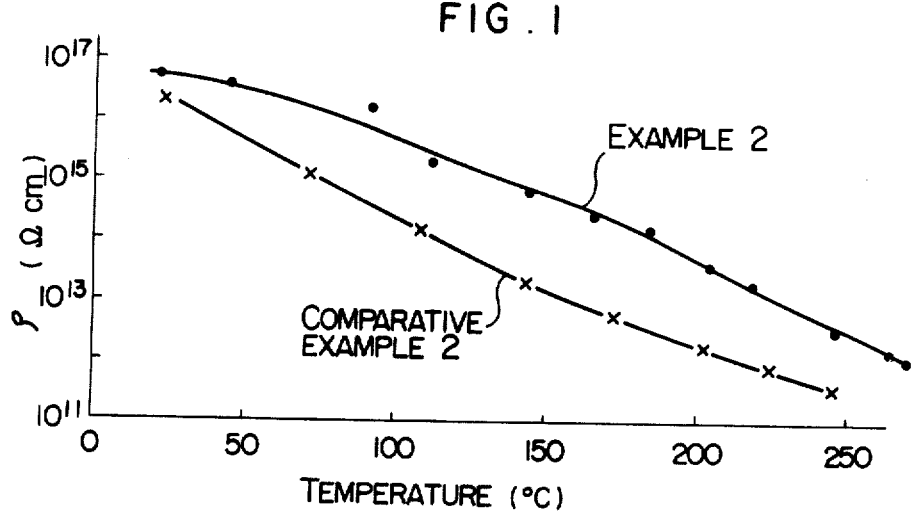

United States Patent [19]

Tanaka et al.

[11] 3,892,643

[45] July 1, 1975

[54] THERMALLY CURABLE COMPOSITIONS AND PROCESS FOR CURING SAID COMPOSITIONS

[75] Inventors: Goro Tanaka; Toshikazu Narahara, both of Hitachi, Japan

[73] Assignee: Hitachi, Ltd., Japan

[22] Filed: Apr. 30, 1974

[21] Appl. No.: 465,586

[30] Foreign Application Priority Data
May 2, 1973  Japan.............................. 48-48499
May 2, 1973  Japan.............................. 48-48500

[52] U.S. Cl.......... 204/159.13; 260/2 S; 260/46.5 E; 260/46.5 G; 260/46.5 H; 260/77.5 NC; 260/248 NS; 260/448.2 N; 260/827
[51] Int. Cl............................................... B01j 1/10
[58] Field of Search........ 260/2 S, 77.5 NC, 46.5 E, 260/46.5 G, 46.5 H, 248 NS, 448.2 N, 827; 204/159.13

[56] References Cited
UNITED STATES PATENTS
3,517,001  6/1970  Berger .......................... 260/248 NS

*Primary Examiner*—Melvyn I. Marquis
*Attorney, Agent, or Firm*—Craig & Antonelli

[57] ABSTRACT

A thermally curably composition consisting essentially of (a) a silicon hydride compound having at least two hydrogen atoms bonded to silicon atom and (b) at least one isocyanuric acid compound selected from trialkenyl isocyanurates and derivatives thereof. A cured product having thermal resistance, mechanical strength and adhesive property can be obtained by heating said composition to a temperature of 50°–400°C.

51 Claims, 4 Drawing Figures

THERMALLY CURABLE COMPOSITIONS AND PROCESS FOR CURING SAID COMPOSITIONS

The present invention relates to thermally curable compositions and a process for curing said compositions. More particularly, the invention pertains to thermally curable compositions consisting essentially of (a) a silicon hydride compound having at least two hydrogen atoms bonded to silicon atom and (b) at least one isocyanuric acid selected from trialkenyl isocyanurates and derivatives thereof, and a process for curing said compositions. According to the process of the present invention, a cured product having excellent thermal resistance, mechanical strength and adhesive property can be obtained.

It is known that isocyanurate ring-containing polymers have excellent thermal resistance. However, this kind of polymers are not put to practical use owing to their poor flexibility. For example, polyisocyanurate resins obtained by polymerizing a trialkenyl isocyanurate in the presence of a free radical polymerization catalyst are hard and brittle and thereby many cracks are formed on curing. Therefore, it is impossible to mold them into a practical form. In order to obviate this defect, it has been considered to free radical-copolymerize them with another polymerizable monomer such as diallyl phthalate. However, such copolymerization with another polymerizable monomer has impaired thermal resistance properties remarkably and it has not been possible to obtain an expected improvement in flexibility. Also, polyisocyanurate resins obtained by polymerizing a polyisocyanate compound in the presence of a trimerization catalyst are known, but these resins are not practical in that they are also hard and brittle and thereby form cracks on curing. In order to improve the flexibility of the polyisocyanurate resins, the introduction of an ester bond by copolymerization with a lactone and the introduction of an oxazolidone ring by copolymerization with an epoxide have been proposed. According to these methods, a certain degree of effects can be obtained. Particularly, isocyanurate-oxazolidone polymers obtained by copolymerizing a polyisocyanate with a polyepoxide have moderate flexibility and rigidity and are excellent in curability and moldability. However, the isocyanurate-oxazolidone polymers are inferior to isocyanurate polymers in thermal resistance and their electric properties are not satisfactory. Their greatest defects reside in that the pot life of a varnish containing a curing catalyst such as an amine is as short as one day or less since the starting isocyanates are very active compounds, the polymers must be stored in a strictly sealed state since they are easily reacted with moisture in air to be changed in quality, and they must be carefully handled owing to the toxicity of isocyanates.

An object of the present invention is to provide thermally curable compositions which can give a cured product having excellent thermal resistance, flexibility, mechanical strength, electric insulating property and adhesive property.

Another object of this invention is to provide thermally curable compositions having a long pot life and low toxicity.

Figure 2:
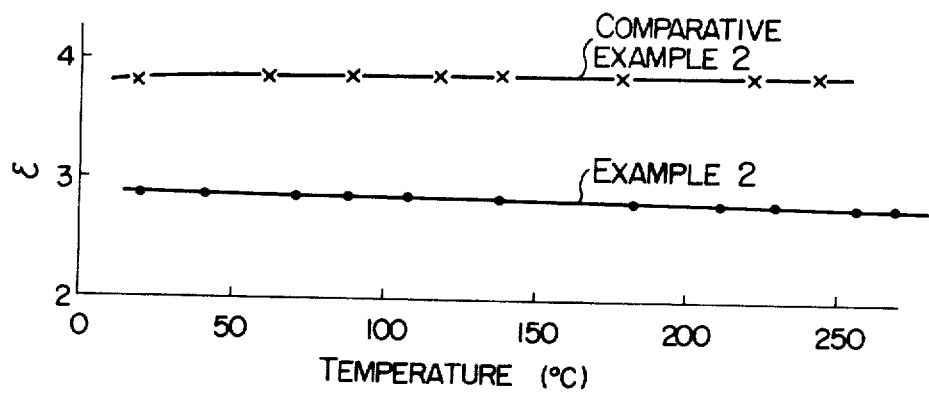
Figure 3:
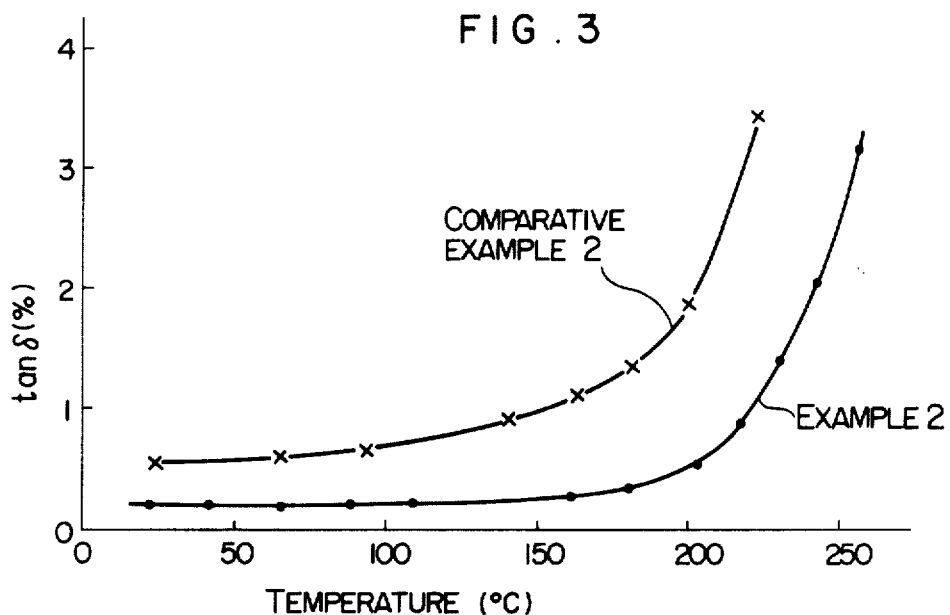

Other objects and a fuller understanding of the invention may be had by referring to the following description and claims, taken in conjunction with the accompanying drawings in which:

FIGS. 1 to 3 show a relationship between the electric properties of cured products and temperature, FIG. 1 showing insulation resistance-temperature characteristics, FIG. 2 dielectric constant-temperature characteristics and FIG. 3 tan δ-temperature characteristics. Also, FIG. 4 explains the thermal resistance of the cured products, showing a relationship between heating residue % and heating temperature.

The thermally curable compositions according to the present invention consists essentially of (a) a silicon hydride compound having at least two hydrogen atoms bonded to silicon atom and (b) at least one isocyanuric acid compound selected from trialkenyl isocyanurates and derivatives thereof.

The compositions of the present invention may be cured into a useful cured product by addition polymerization between said silicon hydride compound (a) and said isocyanuric acid compound (b) or by such addition polymerization followed by free radical polymerization. The addition polymerization reaction is addition of the hydrogen contained in the silicon hydride compound (a) to the unsaturated bond contained in the isocyanuric acid compound (b). The form of the reaction and the chemical structure of the cured product obtained depend upon the number of the functional groups (the number of hydrogen atoms bonded to silicon atom) in the component (a) and the equivalent ratio of the component (a) to the component (b), but the basic reaction mechanism is considered to be as shown in the following formula with regard to the silicon hydride compounds having two hydrogen atoms bonded to silicon atom.

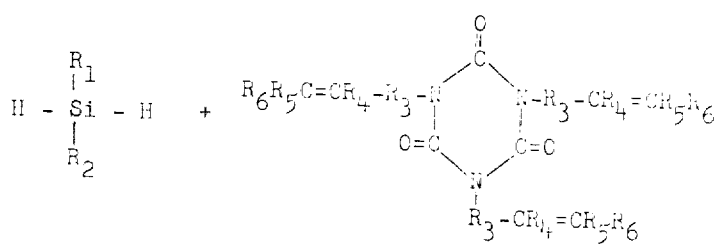

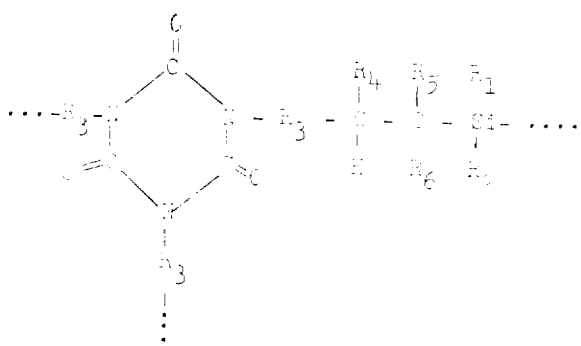

wherein $R_1$ and $R_2$ are atoms and atomic groups as described below, $R_3$ is an organic group as described below, and $R_4$, $R_5$ and $R_6$ each are hydrogen atom, a halogen atom or an alkyl group.

The component (a) and the component (b) are usually mixed in a substantially equimolar ratio and cured. If active groups such as the hydrogen in the component (a) and the alkenyl group or derivative thereof in the component (b) remains in a large number after curing, there is the possibility that the remaining active groups react with moisture, oxygen, etc., in air to effect the deterioration of the cured product. In the present invention, however, such remaining active groups play an effective role when the reaction product is used as a varnish soluble in solvents, a dehydrogenation cure-type varnish or an intermediate in organic synthesis. Also, low molecular weight addition products or prepolymers can be obtained by reducing the number of functional groups. Particularly, it is of a practical significance to leave part of the alkenyl group in the component (b) and subject it to free radical polymerization. From this point of view, in the present invention, a mixing ratio of the component (a) and the component (b) can be freely varied within an equivalent ratio range of 0.2 – 1.2 : 1 and preferably 0.3 – 1 : 1.

In addition polymerization reaction between the component (a) and the component (b) according to the present invention, a solvent is not necessarily required. However, when a solvent-type varnish is to be prepared, it is possible to use a solvent. If a solvent is used, stirring operation in addition polymerization or control of heat of reaction is comparatively easy. Of course, even if such a solvent-type varnish is to be prepared, the reaction can be carried out in the absence of a solvent and the reaction product can be dissolved in a solvent. There is no limit to the solvent used. Any solvent, which is compatible with the reactants or the resulting resinous substance, such as benzene, toluene or methyl ethyl ketone can be used irrespective of whether or not it is aromatic or aliphatic.

In the present invention, addition polymerization is carried out in the absence of a catalyst at a high temperature of 200° to 400°C or more. Also, in the presence of an addition polymerization catalyst, the reaction may be carried out at a temperature of 250°C or less. Usually, the present invention can be accomplished by carrying out the reaction in the presence of the addition polymerization catalyst at a temperature of 50° to 150°C. The above-mentioned temperature range is most rational in view of the reaction rate and easiness in heating operation. Also, heating may be carried out by increasing the temperature stepwise. As the above-mentioned addition polymerization catalyst, all of known ones such as, for example, a Lewis acid, an organic base, palladium-alumina, Raney nickel, platinum, a peroxide, ultraviolet ray or γ-ray can be used. Platinum black, platinized asbestos, platinum-silica gel, platinum-active carbon, platinum-alumina, chloroplatinic acid, a chloroplatinate, a chloroplatinic acid complex salt, etc. are particularly useful. The addition polymerization catalyst is used in an amount substantially enough to show a cure accelerating action. The specific amount of the catalyst used depends upon the kind of the catalyst and the reaction temperature and cannot be fixed. When the catalyst used is other than ultraviolet ray or γ-ray, an amount of about $10^{-6}$ to $10^{-4}$ mole catalyst per equivalent of Si — H group is sufficient.

If the addition polymerization reaction in the present invention is stopped halfway, a solvent-soluble prepolymer is obtained. The prepolymer can be used as a casting material, an impregnant, a coating agent or an adhesive by dissolving in a solvent or as such. Also, a cured product can be obtained by completing the addition polymerization reaction at a stroke. In this case, the addition polymerization is preferably carried out and completed in a state adapted to the desired product.

The component (a) used in the present invention, a silicon hydride compound, is represented by the formula,

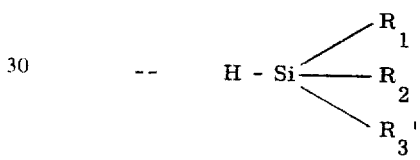

wherein $R_1$, $R_2$ and $R_3'$ are atoms or atomic groups bonded to silicon atom such as hydrogen atom, an organic group, an organic silicon group or a halogen atom and at least 'of $R_1$, $R_2$ and $R_3$ is hydrogen atom or an organic silicon group containing a H — Si bond. Specifically, as component (a), at least one of silane compound such as, for example, Si — $H_4$, $H_2$ — $SiCl_2$, $(Cl_2.H—Si)_2.CH_2$, $(CH_3)_2.Si—H_2$, $C_6H_5.Si—H_3$, $C_6H_5.Si—H_2.(OC_2H_5)$, $(C_6H_5)_2.Si—H_2$, $C_5H_{11}.Si—H_3$, etc. or siloxane compound such as, for example,

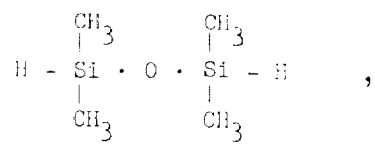

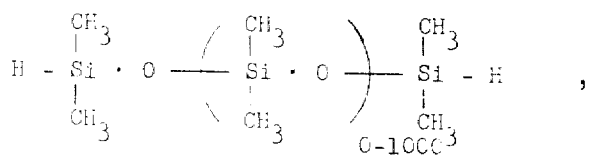

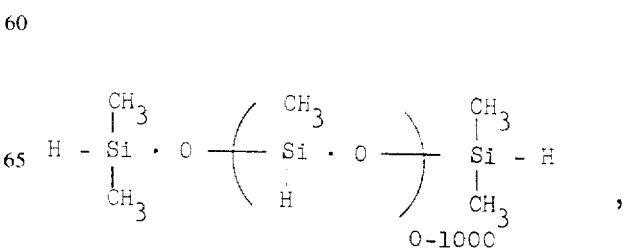

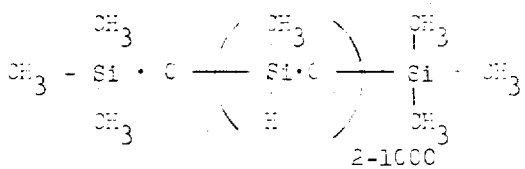

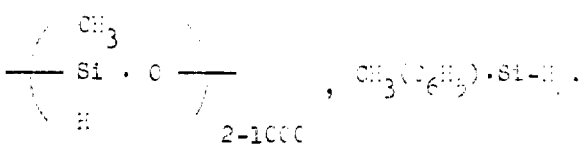

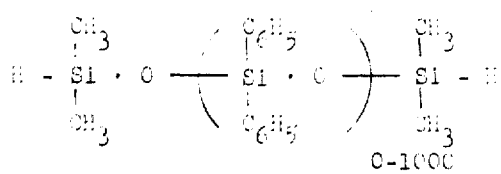

is used.

The component (b), a trialkenyl isocyanurate, is represented by the formula,

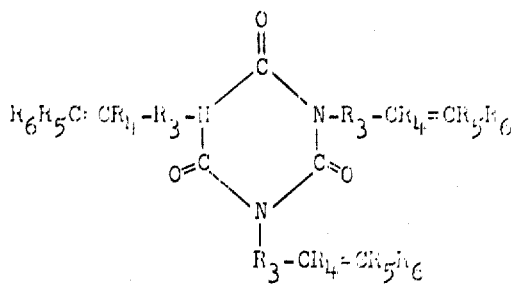

wherein $R_3$ is an organic group, and $R_4$, $R_5$ and $R_6$ each are hydrogen atom, a halogen atom or an alkyl group, and is exemplified by triallyl isocyanurate, tricrotyl isocyanurate, trimethacryl isocyanurate, trichloropropenyl isocyanurate, tributadienyl isocyanurate, etc. Also, derivatives thereof means compounds obtained by replacing one or two alkenyl groups of the trialkenyl isocyanurates by a substituent such as an alkyl group, a silylalkyl group, an aryl group, etc.

When a hydrolyzable group such as a halogen atom or an alkoxy group remains in the alkenyl group or derivative thereof in the cured products obtained according to the present invention, the hydrolyzable group can be removed by hydrolysis if the group is unnecessary. Also, the silicone resin present can be modified by co-hydrolysis with a silicone conventionally used.

In the composition of the present invention, at least one each of silicon hydride compounds as the component (a) and isocyanuric acid compunds as the component (b) are used. For example, (1) a combination of one of the components (a) and one of the components (b), (2) a combination of one of the components (a) and two or more of the components (b), and (3) a combination of two or more of the components (a) and one of the components (b) can be used.

Also, during addition polymerization and curing of the components (a) and (b), at least one unsaturated group-containing compound may be added to and co-polymerized with components (a) and (b). Such copolymerization with unsaturated group-containing compounds is effective for modifying the objective cured product and providing other properties, and particularly has a remarkable cost reducing effect. The unsaturated bond-containing compounds used are exemplified by diallyl phthalate, vinylsiloxane, etc.

The other conditions utilized for carrying out addition polymerization in the present invention may suitably be selected from the usual conditions employed for addition polymerization reactions.

The composition of the present invention can be cured by carrying out addition polymerization reaction and free radical polymerization reaction simultaneously. The free radical polymerization reaction may be carried out by leaving part of the alkenyl group in the above-mentioned component (b) or by using the unreacted component (b). Thus, the free radical polymerization reaction is polymerization between alkenyl groups. The basic reaction mechanism is shown by the following formula,

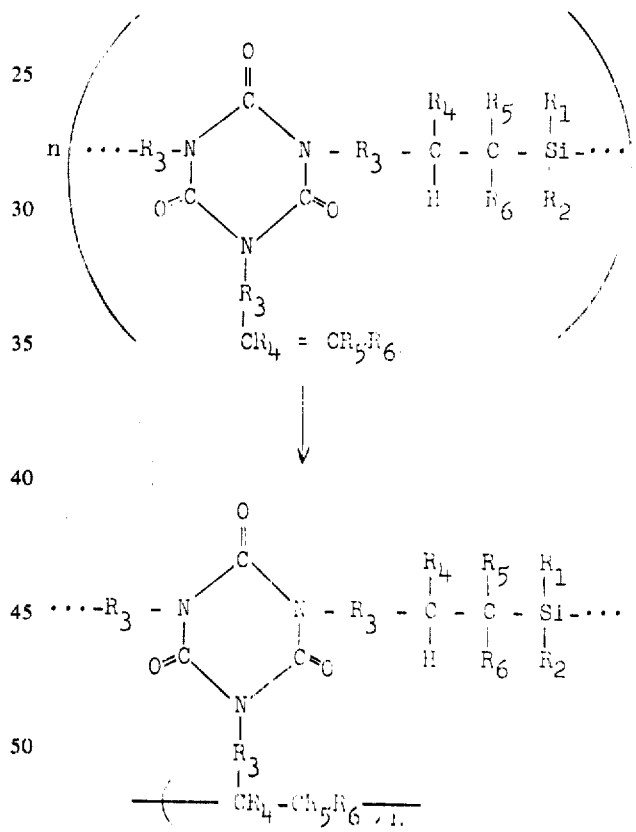

When the radical polymerization is simultaneously carried out, substantially no H — Si bond remains at this point and thereby the moisture resistance and pot life of the varnish as well as the mechanical strengths such as, for example, tensile strength or bending strength of the resulting cured product are improved as compared with curing by addition polymerization reaction only. However, flexibility is slightly poorer than curing by addition polymerization reaction only. Therefore, it is advisable to decide whether or not the radical polymerization reaction is carried out simultaneously according to the characteristic properties required for the product. When the radical polymerization reaction is used simultaneously in the present invention, the curing is accomplished by (i) stopping the addition polymerization reaction halfway and then replacing the addition polymerization reaction by the radical polymerization reaction, or (ii) using less than one equivalent of the component (a) per equivalent of the component (b) and carrying out the radical polymerization after the completion of the addition polymerization reaction. When the method (i) is adopted, the point when the addition polymerization is stopped can be freely selected. As described above, the properties of the cured product vary according to a ratio of the addition polymerization to the free radical polymerization. Therefore, the ratio should be selected according to the properties required for the cured product. It is equally true in the method (ii). Thus, a ratio of the amount of the component (b) used to the amount of the component (a) used should be decided according to the properties required for the cured product. The properties of the cured product substantially differ from those obtained by addition polymerization alone when 0.8 equivalent or less of the component (a) is used for one equivalent of the component (b).

As the catalyst for the free radical polymerization reaction, at least one of peroxides such as dicumyl peroxide, acetylcyclohexylsulfonyl peroxide, isobutyl peroxide, butyl peroxide, lauroyl peroxide, benzoyl peroxide, di-tert-butyl peroxide, cumene hydroperoxide, diisopropylbenzene hydroperoxide, tert.-butyl peroxybenzoate, etc., azo compounds such as azobisisobutyronitrile, etc., may be used. The reactivity (curing activity) of the above-mentioned free radical polymerization catalyst depends upon the amount thereof used. Usually, the catalyst is used in an amount of 0.2 to 5 % by weight based on the weight of the objective composition. The use of an amount of more than 5 % by weight is not preferable since the cured product becomes more liable to be deteriorated by heat. The radical polymerization reaction may be carried out by heating to a temperature higher than the decomposition temperature of the free radical polymerization catalyst used. It is allowable to heat to 400°C, so long as heating time is very short. Also, the heating may be carried out by increasing the temperature stepwise.

To the composition of the present invention, a filler such as silica, alumina, glass, talc, zircon, quartz glass, etc. and an aliphatic or aromatic solvent such as toluene, xylene, methyl ethyl ketone, methyl isobutyl ketone, cyclohexanone, ethyl acetate, amyl acetate, etc. can be added. The amounts of the above-mentioned respective additives used can be freely decided in accordance with the amounts conventionally used in silicone resins, epoxy resins, etc.

The above-mentioned composition consisting essentially of (a) a silicon hydride compound and (b) an isocyanuric acid compound and the composition obtained by blending (c) an addition polymerization catalyst and/or a free radical polymerization catalyst with said composition can be used as a varnish, that is, as an impregnant, a coating agent, an adhesive as such. Also, by carrying out addition polymerization reaction only, they can be used as a B stage composition, that is, as an insulating prepreg material or an adhesive prepreg material. Such compositions obtained by carrying out addition polymerization reaction only so that Si—H bonds may be completely reacted and double bonds may remain have an advantage in that an increase in viscosity and gellation due to moisture absorption can be prevented.

The composition of the present invention has various uses and is useful as, for example, an insulating varnish, an impregnating varnish, a laminating varnish, a molding material, an adhesive, a surface coating agent, etc.

The following examples illustrate the present invention, but the present invention is not limited thereto.

EXAMPLE 1

Into a 1000 cc four neck flask equipped with a stirrer, a thermometer, a reflux condenser and a dropping funnel, 125 g (0.5 mole) of triallyl isocyanurate and 200 ml of benzene were charged and mixed. Thereto was added 25 ml of a solution of chloroplatinic acid in methyl ethyl ketone (concentration 0.001 mole/l). The mixture was heated to 85°C and slowly refluxed.

Into the dropping funnel was charged 33.6 g (0.25 mole) of 1,1,3,3,-tetramethyldisiloxane, which was slowly dropped in 50 minutes. After the completion of dropping, a small amount of the reaction liquid was sampled and poured into a solution of potassium hydroxide in alcohol. As the generation of hydrogen gas was observed, the reaction was continued for additional 3 hours. When the reaction liquid was again sampled and poured into a solution of potassium hydroxide, the generation of hydrogen gas was no more observed and it was confirmed that hydrogen bonded to silicon was substantially completely reacted and disappeared. Refluxing was continued for additional one hour. The reaction liquid was cooled to room temperature and washed by adding 100 ml of a 5 % aqueous sodium carbonate solution and then washed twice with each 100 ml of distilled water. After washing, the aqueous layer was removed and the benzene solution of the reaction product was dehydrated and dried with magnesium sulfate. Benzene was then distilled off to obtain 131.07 g of a viscous liquid. The infrared absorption spectrum of the liquid showed that an absorption at 2200 cm$^{-1}$ which had been observed before the reaction disappeared. It demonstrated that HSi ≡ had disappeared. Also, its nuclear magnetic resonance spectrum showed that a signal at 4.6 p.p.m. which had been present before the reaction disappeared and a new signal at 0.5 p.p.m. was generated. It demonstrated that ≡ N(CH$_2$)$_3$—Si ≡ had been formed.

The above-mentioned results confirmed that the chemical structure of the product was as follows:

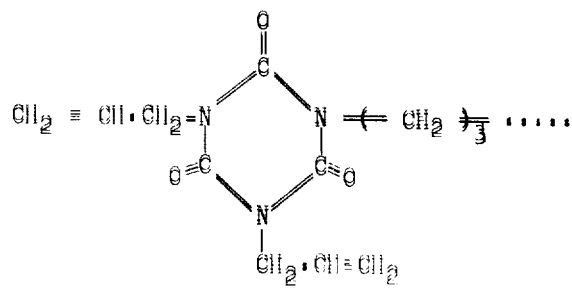

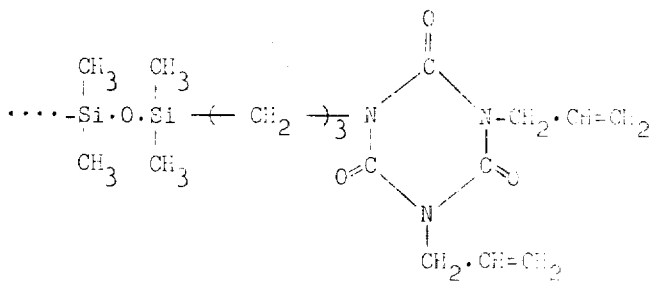

The above-mentioned chemical structure was also confirmed by the integrated value of the nuclear magnetic resonance spectrum, the molecular weight value measured and the elementary analysis values.

When the above-mentioned reaction product was heated to 100°C in the presence of one percent by weight of dicumyl peroxide, it was cured in 135 minutes. When it was heated to 120°C, it was cured in 15.6 minutes. When the above-mentioned reaction product containing one percent by weight of dicumyl peroxide was placed between two silicone surface-treated iron plates and heated and cured at 100°C for 10 hours, 120°C for 5 hours, 150°C for 2 hours, 180°C for 2 hours, 200°C for 2 hours and then 225°C for 15 hours, a transparent and rigid resin plate was obtained. The temperature at which the heating loss of the resulting resin plate started (in nitrogen stream, heating rate 10°C/min) was 440°C.

Comparative Example 1

The same triallyl isocyanurate as used in Example 1 alone was heated and cured in the presence of one percent by weight of dicumyl peroxide under the same heating conditions as in Example 1. As a result, many cracks were formed in the resulting cured product and no satisfactory resin plate could not be obtained. The temperature at which the heating loss of the resulting cured product started (in nitrogen stream, heating rate 10°C/min.) was 410°C.

EXAMPLE 2

Addition polymerization reaction was carried out in the same manner as in Example 1 except that an amount of triallyl isocyanurate used was 150 g (0.6 mole) and an amount of 1,1,3,3-tetramethylsiloxane used was 53.7 g (0.4 mole). Thus, 198 g of the reaction product was obtained. It was confirmed that the reaction product had a chemical structure represented by the formula,

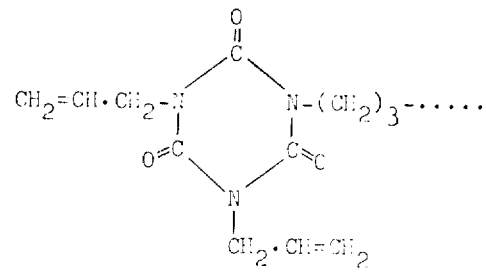

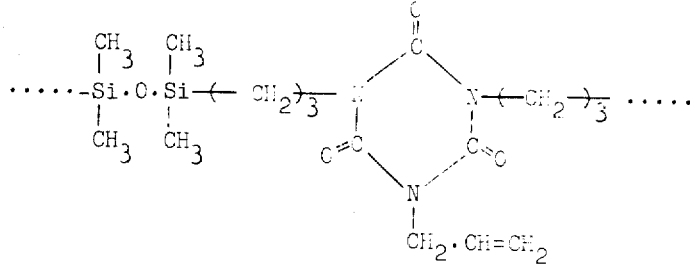

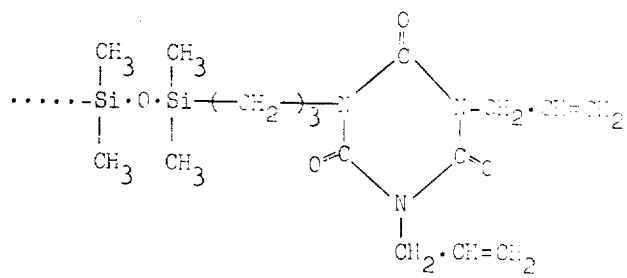

The above-mentioned reaction product was cured by radical polymerization under the same conditions as in Example 1. The temperature at which the heating loss of the resulting cured product started (in nitrogen stream, heating rate 10°C/min.) was 440°C. The volume resistivity ($\rho$), dielectric constant ($\epsilon$) and dielectric loss (tan $\delta$) of the cured product as measured are shown in FIGS. 1 to 3 of the accompanying drawings. Here, $\rho$ was measured after charging for one minute at an applied voltage of 100 V, and $\epsilon$ and tan $\delta$ were measured by Schering bridge at an applied voltage of 1 kV (60 Hz).

Comparative Example 2

For comparison, the characteristic properties of an isocyanurate-oxazolidone polymer obtained by copolymerizing a polyisocyanate and a polyepoxide are shown.

Figure 4:
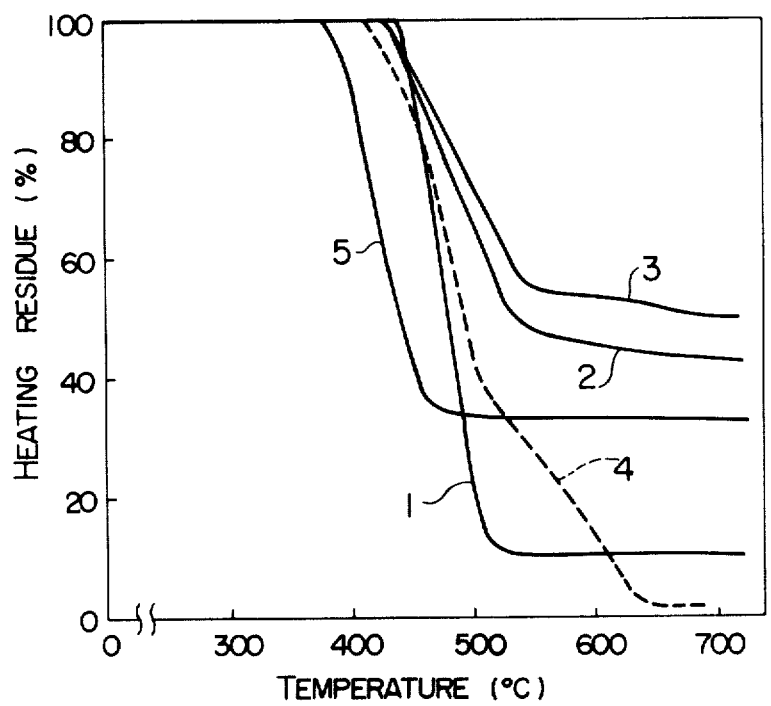

A composition consisting of 100 g of diphenylmethanediisocyanate, 56 g of diglycidyl ether of bisphenol A and 0.3 g of N-methylmorpholine as a catalyst was cured under the same conditions as in Example 1 to obtain the polymer. The temperature at which the heating loss of the resulting cured product started (in nitrogen stream, heating rate 10°C/min.) was 380°C as shown in FIG. 4. Thus, the cured product of this example was inferior in thermal resistance to the isocyanurate homopolymer of Comparative Example 1 (the temperature at which the heating loss started 410°C) and the copolymers of Examples 1 and 2 (the temperature at which the heating loss started 440°C). Also, $\rho$, $\epsilon$ and tan $\delta$ of the cured product of this example are shown in FIGS. 1 to 3. As is clear from FIGS. 1 to 3, the cured product of Comparative Example 2 has a smaller $\rho$, a larger $\epsilon$ and a larger tan $\delta$ than that of Example 2. Therefore, the cured product of Example 2 is superior to that of Comparative Example 2 as an insulating material. Further, as shown in FIG. 3, the temperature at which tan $\delta$ begins to increase in the cured product of Example 2 is higher than that in the cured product of Comparative Example 2. It demonstrates that the cured products obtained according to the present invention are excellent in thermal resistance.

Also, when the composition of this comparative example was allowed to stand at room temperature, it jellified after 5 hours. The jellified composition was converted into a brittle powdery solid and did not give a polymer of practical value even if it was heated. On the other hand, when the composition of Example 2 was stored under the same conditions, no change in its quality was not observed even after one month and it gave a polymer having good properties when heated.

EXAMPLE 3

Into a 100 cc four neck flask equipped with a stirrer, a thermometer, a reflux condenser and a dropping funnel were charged and mixed 13.56 g (0.101 mole) of 1,1,3,3-tetramethyldisiloxane and 25 ml of toluene. Thereto was added 0.3964 g of a platinum-alumina catalyst (5 × 10$^{-5}$ atom Pt/g Alumina) and the mixture was stirred to form a suspension.

The flask was heated to 120°C to reflux the mixture slowly and 8.38 g (0.0337 mole) of triallyl isocyanurate was slowly dropped from the dropping funnel in 20 minutes. After the completion of dropping, refluxing was continued for 4 hours to effect the reaction and the reaction mixture was cooled to room temperature. The reaction liquid was filtered and toluene was removed from the filtrate by distillation. Thus, 19.94 g of a light yellow low viscosity liquid was obtained. It was confirmed that the chemical structure of the product was represented by the formula,

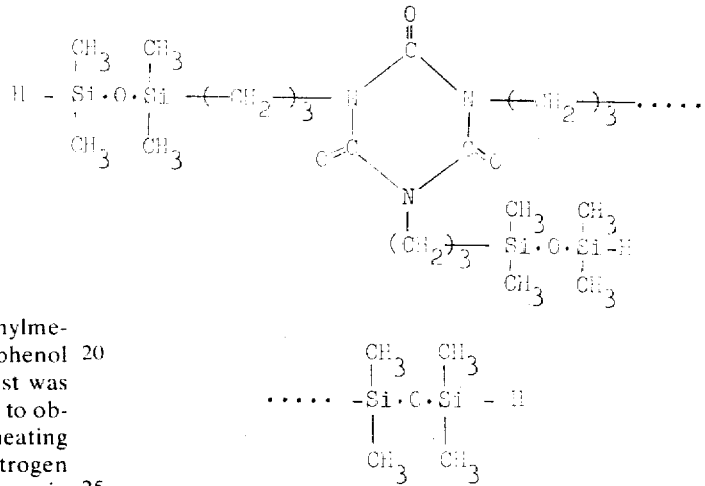

EXAMPLE 4

83 Grams (one equivalent) of triallyl isocyanurate and 60 g (one equivalent) of 1,3,5,7,9-pentamethylcyclopentasiloxane were mixed to form a transparent light yellow liquid mixture. To 10 g of this mixture was added 0.015 ml of a 2 % solution of chloroplatinic acid in butyl alcohol as an addition polymerization catalyst. The mixture was cured in 6.8 minutes by heating it to 120°C in the absence of a solvent to effect addition polymerization. Also, when 0.010 ml of said catalyst solution was added, the mixture was cured in 126 minutes. When 0.035 ml of the catalyst solution was added and the mixture was heated to 100°C, the mixture was cured in 4.4 minutes. When 0.030 ml of the catalyst solution was added and the mixture was heated to 100°C, the mixture was cured in 130 minutes. Thus, a uniform transparent cured product was obtained.

EXAMPLE 5

15.86 Grams (0.1 equivalent) of the reaction product obtained in Example 1 was mixed with 6.0 g (0.1 equivalent) of 1,3,5,7,9-pentamethylcyclopentasiloxane, and 0.0015 ml of a 2 % chloroplatinic acid solution was added as an addition polymerization catalyst. The mixture was heated at 120°C for 5 hours to obtain a light yellow transparent cured product.

EXAMPLE 6

10.9 Grams (0.05 equivalent) of the reaction product obtained in Example 3 and 4.2 g (0.05 equivalent) of triallyl isocyanurate were mixed, and 0.0008 ml of a 2 % chloroplatinic acid solution was added as an addition polymerization catalyst. The mixture was heated at 120°C for 5 hours to obtain a light yellow transparent cured product.

EXAMPLE 7

To 10 g of a mixture obtained by blending the reaction product having an unreacted alkenyl group obtained in Example 2 and the reaction product having an unreacted hydrogen atom obtained in Example 3 in a 1 : 1 equivalent ratio, 0.030 ml of a 2 % solution of chloroplatinic acid in butanol was added as an addition polymerization catalyst. The mixture was placed between two silicone surface-treated iron plates and then cured under the conditions of 100°C/10 hours, 120°C/5hours, 150°C/2 hours, 180°C/2 hours, 200°C/2 hours and then 225°C/15 hours. As a result, a uniform rigid plate cured product was obtained.

EXAMPLE 8

10 Grams of a composition consisting of one equivalent of triallyl isocyanurate and one equivalent of 1,3,5-,7-tetramethylcyclotetrasiloxane was subjected to addition polymerization to cure in the same manner as in Example 5. Thus, a homogeneous rigid plate cured product was obtained.

EXAMPLE 9

10 Grams of a composition consisting of one equivalent of triallyl isocyanurate and one equivalent of 1,3,5-,7,9-pentamethylcyclopentasiloxane was subjected to addition polymerization to cure in the same manner as in Example 5. Thus, a homogeneous rigid plate cured product was obtained.

The heating loss characteristics of the cured products obtained in the above-mentioned Examples 7 to 9 are shown in FIG. 4. FIG. 4 is a graph showing a relationship between heating temperature and heating residue %, in which curves 1, 2, and 3 represent the characteristics of the cured products of Example 7, Example 8 and Example 9, respectively. Also, curves 4 and 5 represent the chharacteristics of the cured products of Comparative Example 1 and Comparative Example 2, respectively.

EXAMPLE 10

274 Grams (1.1 moles) of triallyl isocyanurate and 134 g (1 mole) of 1,1,3,3-tetramethylsiloxane were subjected to addition polymerization in the same manner as in Example 1. It was confirmed that the reaction product had a chemical structure of the formula,

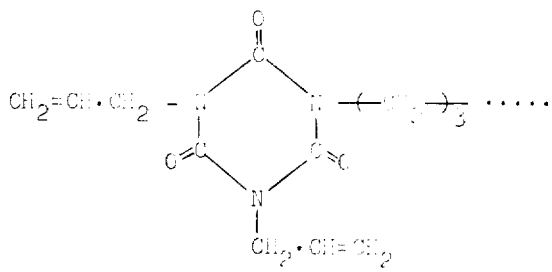

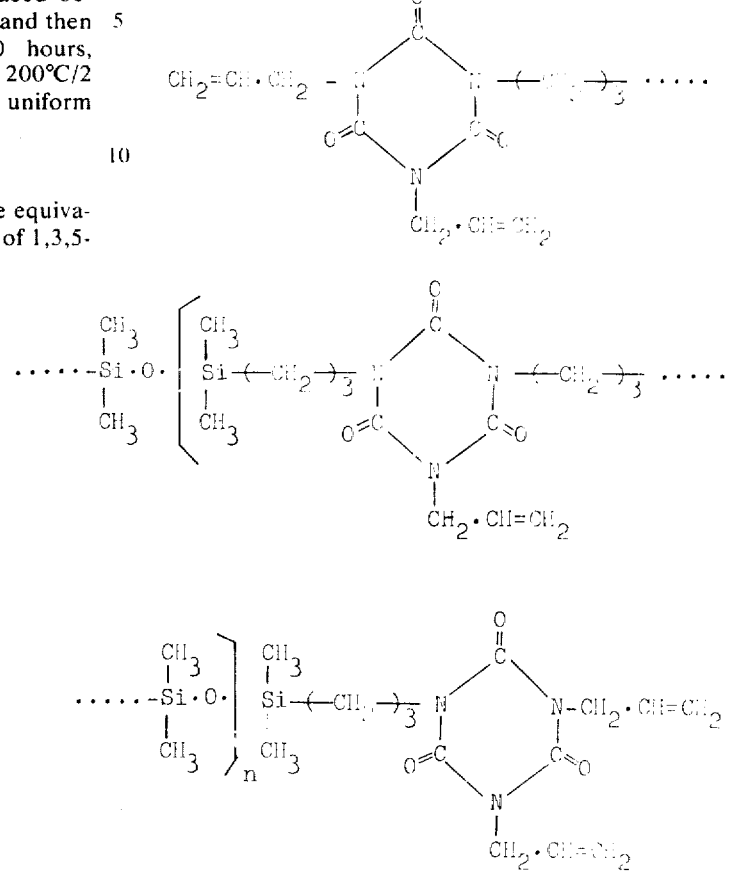

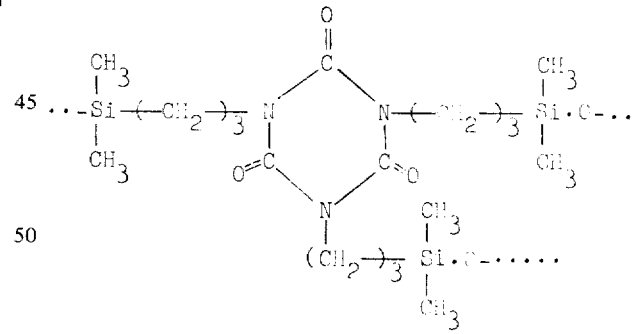

wherein $n$ is 9 on an average and that in its structure some units of the formula, were contained.

80 Grams of the above-mentioned reaction product was mixed with 20 g of triallyl isocyanurate, and one percent by weight of dicumyl peroxide was then added. The mixture was subjected to free radical polymerization to cure under the same conditions as in Example 1. The temperature at which the heating loss of the resulting cured product started (in nitrogen stream, heating rate 10°C/min.) was 410°C.

On the one hand, one percent by weight of dicumyl peroxide was added to the reaction product having the above-mentioned chemical structure. The mixture was heated to cure under the same conditions as in Example 1. The tensile strength of the thus obtained cured product was 305 kg/cm². In view of the fact that the tensile strength of no-solvent type silicone resins is usually 50 kg/cm² and at most 100 kg/cm², it will be understood that the cured products obtained according to the present invention are very rigid.

What is claimed is:

1. A thermally curable composition comprising a silicon hydride compound having at least two hydrogen atoms bonded to silicon atom and (b) at least one isocyanuric acid compound selected from the group consisting of trialkenyl isocyanurates and derivatives thereof obtained by replacing one alkenyl group of a trialkenyl isocyanurate with an alkyl, silylalkyl or aryl group.

2. The composition of claim 1 further comprising (c) an additional polymerization catalyst in an amount effective to catalyze addition polymerization between components (a) and (b).

3. The composition of claim 2 further comprising (d) a free radical polymerization catalyst in an amount effective to catalyze polymerization of alkenyl groups in said trialkenyl cyanurate or derivative.

4. The composition of claim 1, wherein 0.2 to 1.2 equivalents of the silicon hydride compound (a) are blended with 1 equivalent of the isocyanuric acid compound (b).

5. The composition of claim 1, wherein 0.3 to 1 equivalent of the silicon hydride compound (a) is blended with 1 equivalent of the isocyanuric acid compound (b).

6. The composition of claim 2, consisting essentially of 0.2 to 1.2 equivalents of the silicon hydride compound for each equivalent of the isocyanuric acid compound and $10^{-6}$ to $10^{-4}$ mole addition polymerization catalyst for each equivalent of Si — H groups in the silicon hydride compound.

7. The composition of claim 3, consisting essentially of 0.2 to 1.2 equivalents of the silicon hydride compound for each equivalent of the isocyanuric acid compound, $10^{-6}$ to $10^{-4}$ mole of the addition polymerization catalyst for each equivalent of Si — H groups in the silicon hydride compound and (d) 0.2 to 5 % by weight free radical polymerization catalyst based on the total weight of the composition.

8. A process for curing a thermally curable composition comprising (a) 0.2 to 1.2 equivalents of a silicon hydride compound having at least two hydrogen atoms bonded to silicon atom and (b) 1 equivalent of at least one isocyanuric acid compound selected from the group consisting of trialkenyl isocyanurates and derivatives thereof obtained by replacing one alkenyl group of trialkenyl isocyanurate with an alkyl, silylalkyl or aryl group, which comprises heating said composition to a temperature of 200° to 400°C. to effect addition polymerization of said silicon hydride with said isocyanuric acid compound.

9. The process of claim 8, wherein said composition contains (a) 1 equivalent of said silicon hydride compound (b) 1 equivalent of said isocyanuric acid compound and $10^{-6}$ to $10^{-4}$ mole per equivalent of Si — H groups in the silicon hydride compound of an addition polymerization catalyst, said process comprising heating said composition to a temperature of about 50° to 250°C.

10. The process of claim 9, wherein said composition contains about 0.2 to 5 % by weight of a free radical polymerization catalyst based on the total weight of said composition, said process further comprising heating said composition to the thermal decomposition temperature of the radical polymerization catalyst to thereby polymerize free alkenyl groups attached to the isocyanurate rings in the addition polymer obtained by addition polymerization.

11. A process for curing a thermally curable composition consisting essentially of (a) 0.2 to 1.2 equivalents of a silicon hydride compound having at least two hydrogen atoms bonded to silicon atom and (b) 1 equivalent of at least one isocyanuric acid compound selected from the group consisting of trialkenyl isocyanurates and derivatives thereof obtained by replacing one alkenyl group of a trialkenyl isocyanurate with an alkyl, silylalkyl or aryl group which comprises heating the composition to a temperature of 50° to 400°C. in the presence of $10^{-6}$ to $10^{-4}$ mole per equivalent of the Si — H groups in the silicon hydride compound (a) of an addition polymerization catalyst (c) and 0.2 to 5 % by weight of a radical polymerization catalyst (d) based on the total weight of said composition to simultaneously effect:

I. addition polymerization of said silicon hydride (a) and said isocyanuric acid compound (b), thereby forming polymer chains in which silicon hydride moieties and isocyanuric acid compound moieties are directly linked, said isocyanuric acid compound moities containing pendant alkenyl groups, and II. free radical polymerization of said pendant alkenyl groups whereby isocyanuric acid compound moieties in said polymer chains are directly linked via polymerized alkenyl groups.

12. A thermally curable composition comprising (a) at least one silicon hydride compound represented by the formula:

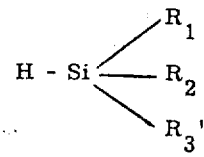

wherein $R_1$, $R_2$ and $R_3'$ are hydrogen, halogen, organic groups or organic silicon groups and at least one of $R_1$, $R_2$ and $R_3'$ is hydrogen or an organic silicon group containing at least one H — Si bond and (b) at least one trialkenyl isocyanurate or a derivative thereof represented by the formula,

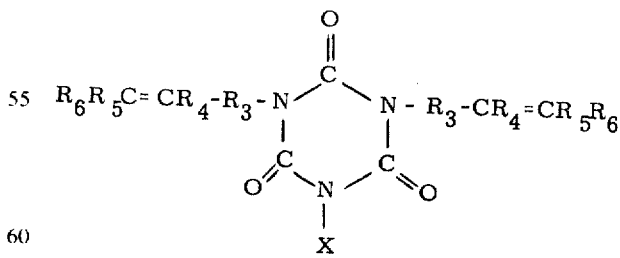

wherein X is $-R_3-CR_4=CR_5R_6$, alkyl, silylalkyl or aryl, $R_3$ is alkylene and $R_4$, $R_5$ and $R_6$ are hydrogen, halogen or alkyl.

13. The composition of claim 12, wherein said composition contains about 0.2 to 1.2 equivalents of said silicon hydride for each equivalent of said trialkenyl isocyanurate or derivative thereof.

14. The composition of claim 13, further including (c) about $10^{-6}$ to $10^{-4}$ mole per equivalent of the H — Si groups in said silicon compound (a) of an addition polymerization catalyst.

15. The composition of claim 14, further including (d) about 0.2 to 5 % by weight of a free radical polymerization catalyst based on the total weight of said composition.

16. A thermally curable composition according to claim 15, wherein said free radical polymerization catalyst is at least one member selected from the group consisting of organic peroxides and organic azo compounds.

17. The composition of claim 16, wherein said free radical polymerization catalyst is at least one member selected from the group consisting of dicumyl peroxide, acetylcyclohexylsulfonyl peroxide, isobutyl peroxide, butyl peroxide, lauroyl peroxide, benzoyl peroxide, di-tert-butyl peroxide, cumene hydroperoxide, diisopropylbenzene hydroperoxide, tert.-butyl peroxybenzoate, and azobisisobutyronitrile.

18. The composition of claim 17, wherein said addition polymerization catalyst is at least one member selected from the group consisting of a Lewis acid, an organic base, palladium-alumina, Raney nickel, platinum, a peroxide, ultraviolet ray, γ-ray, platinum black, platinized asbestos, platinum-silica gel, platinum-active carbon, platinum-alumina, chloroplatinic acid, a chloroplatinate, and a chloroplatinic acid complex salt.

19. The composition of claim 14, wherein said addition polymerization catalyst is at least one member selected from the group consisting of a Lewis acid, an organic base, palladium-alumina, Raney nickel, platinum, a peroxide, ultraviolet ray, γ-ray, platinum black, platinized asbestos, platinum-silica gel, platinum-active carbon, platinum-alumina, chloroplatinic acid, a chloroplatinate, and a chloroplatinic acid complex salt.

20. The composition of claim 12, wherein said silicon hydride compound is selected from the group consisting of Si — $H_4$, $H_2$ — $SiCl_2$, $(Cl_2.H—Si)_2$ $CH_2$, $(CH_3)_2.Si—H_2$, $C_6H_5.Si—H_3$, $C_6H_5$ $Si—H_2.(OC_2H_5)$, $(C_6H_5)_2.Si—H_2$, $C_5H_{11}.Si—H_3$, $CH_3(C_6H_5).Si—H_2$, dimethylpolysiloxane and methylpolysiloxane.

21. The composition of claim 20, wherein said trialkenylisocyanurate or derivative thereof is at least one member selected from the group consisting of triallyl isocyanurate, tricrotyl isocyanurate, trimethacryl isocyanurate, trichloropropenyl isocyanurate.

22. The composition of claim 12, wherein said trialkenyl isocyanurate or derivative thereof is at least one member selected from the group consisting of triallyl isocyanurate, tricrotyl isocyanurate, trimethacryl isocyanurate, trichloropropenyl isocyanurate.

23. The composition of claim 12, wherein said silicon hydride and said trialkenyl isocyanurate are present in equivalent amounts.

24. A process for curing a thermally curable composition comprising (a) at least one silicon hydride compound represented by the formula:

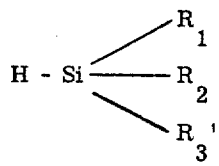

wherein $R_1$, $R_2$ and $R_3'$ are hydrogen, halogen, organic groups or organic silicon groups and at least one of $R_1$, $R_2$ and $R_3'$ is hydrogen or an organic silicon group containing at least one H — Si bond and (b) at least one trialkenyl isocyanurate or a derivative thereof represented by the formula,

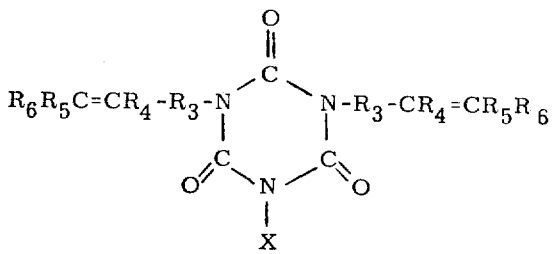

wherein X is $—R_3—CR_4=CR_5R_6$, alkyl, silylalkyl or aryl, $R_3$ is alkylene and $R_4$, $R_5$ and $R_6$ are hydrogen, halogen or alkyl, said process comprising heating said composition to a temperature of about 200° to 400°C.

25. The process of claim 24, wherein said composition is free of a catalyst, heating being continued to effect addition polymerization of said silicon hydride compound with said trialkenyl isocyanurate or derivative thereof.

26. The process of claim 25, wherein said silicon hydride compound is selected from the group consisting of Si — $H_4$, $H_2—SiCl_2$, $(Cl_2.H—Si)_2.CH_2$, $(CH_3)_2.Si—H_2$, $C_6H_5.Si—H_3$, $C_6H_5.Si—H_2.(OC_2H_5)$, $(C_6H_5)_2.Si—H_2$, $C_5H_{11}.Si—H_3$, $CH_3(C_6H_5).Si—H_2$, dimethylpolysiloxane and methylpolysiloxane.

27. The process of claim 25, wherein said trialkenyl isocyanurate or derivative thereof is at least one member selected from the group consisting of triallyl isocyanurate, tricrotyl isocyanurate, trimethacryl isocyanurate, trichloropropenyl isocyanurate.

28. The process of claim 25, wherein said silicon hydride and said trialkenyl isocyanurate are present in equivalent amounts.

29. The process of claim 25, wherein said composition contains about 0.2 to 1.2 equivalents of said silicon hydride for each equivalent of said trialkenyl isocyanurate or derivative thereof.

30. A process for curing a thermally curable composition comprising (a) at least one silicon hydride compound represented by the formula:

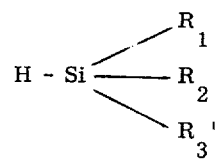

wherein $R_1$, $R_2$ and $R_3'$ are hydrogen, halogen, organic groups or organic silicon groups and at least one of $R_1$, $R_2$ and $R_3'$ is hydrogen or an organic silicon group containing at least one H — Si bond, (b) at least one trialkenyl isocyanurate or a derivative thereof represented by the formula,

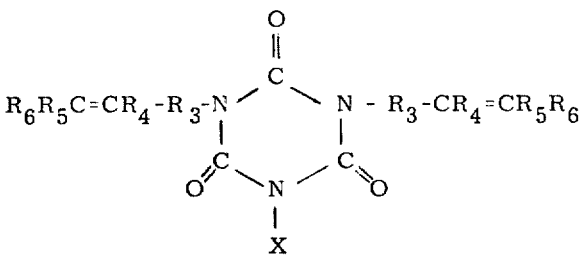

wherein X is $—R_3—CR_4=CR_5R_6$, alkyl, silylalkyl or aryl, $R_3$ is alkylene and $R_4$, $R_5$ and $R_6$ are hydrogen, halogen or alkyl, and (c) about $10^{-6}$ to $10^{-4}$ mole per equivalent of the H — Si groups in said silicon compound (a) of an addition polymerization catalyst, said process comprising heating said composition to a temperature of about 50° to 250°C.

31. The process of claim 30, wherein said composition is heated for a time sufficient to effect addition polymerization of said silicon hydride compound with said trialkenyl isocyanurate or derivative thereof.

32. The process of claim 31, wherein said silicon hydride compound is selected from the group consisting of Si — $H_4$, $H_2$ — $SiCl_2$, $(Cl_2.H—Si)_2.CH_2$, $(CH_3)_2.Si—H_2$, $C_6H_5.Si—H_3$, $C_6H_5.Si—H_2.(OC_2H_5)$, $(C_6H_5)_2.Si—H_2$, $C_5H_{11}.Si—H_3$, $CH_3(C_6H_5).Si—H_2$, dimethylpolysiloxane and methylpolysiloxane.

33. The process of claim 31, wherein said trialkenyl isocyanurate or derivative thereof is at least one member selected from the group consisting of triallyl isocyanurate, tricrotyl isocyanurate, trimethacryl isocyanurate, trichloropropenyl isocyanurate.

34. The process of claim 31, wherein said addition polymerization catalyst is at least one member selected from the group consisting of a Lewis acid, an organic base, palladium-alumina, Raney nickel, platinum, a peroxide, ultraviolet ray, γ-ray, platinum black, platinized asbestos, platinum-silica gel, platinum-active carbon, platinum-alumina, chloroplatinic acid, a chloroplatinate, and a chloroplatinic acid complex salt.

35. The process of claim 31, wherein said composition contains about 0.2 to 1.2 equivalents of said silicon hydride for each equivalent of said trialkenyl isocyanurate or derivative thereof.

36. A process for curing a thermally curable composition comprising (a) at least one silicon hydride compound represented by the formula:

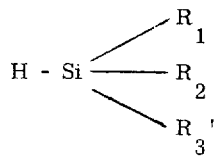

wherein $R_1$, $R_2$ and $R_3'$ are hydrogen, halogen, organic groups or organic silicon groups and at least one of $R_1$, $R_2$ and $R_3'$ is hydrogen or an organic silicon group containing at least one H — Si bond, (b) at least one trialkenyl isocyanurate or a derivative thereof represented by the formula,

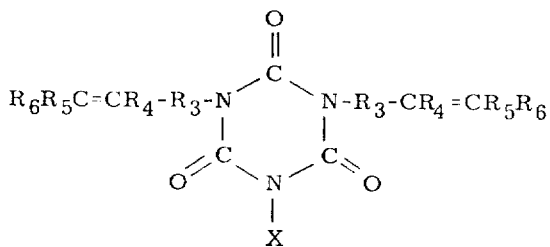

wherein X is —$R_3$—$CR_4$=$CR_5R_6$, alkyl, silylalkyl or aryl, $R_3$ is alkylene and $R_4$, $R_5$ and $R_6$ are hydrogen, halogen or alkyl, (c) about $10^{-6}$ to $10^{-4}$ mole per equivalent of the H — Si groups in said silicon compound (a) of an addition polymerization catalyst, and (d) about 0.2 to 5 % by weight of a free radical polymerization catalyst based on the total weight of said composition, said process comprising heating said composition to a temperature of 50° to 400°C. to effect addition polymerization and free radical polymerization simultaneously.

37. The process of claim 36, wherein said composition is heated to simultaneously effect:

I. addition polymerization of said silicon hydride (a) and said trialkenyl isocyanurate or derivative, (b) thereby forming polymer chains in which silicon hydride moieties and trialkenyl isocyanurate or derivative moieties are directly linked, said trialkenyl isocyanurate or derivative moieties containing pendant alkenyl groups, and II. free radical polymerization of said pendant alkenyl groups whereby trialkenyl isocyanurate or derivative moieties in said polymer chains are directly linked via polymerized alkenyl groups.

38. The process of claim 37, wherein said composition contains about 0.2 to 1.2 equivalents of said silicon hydride for each equivalent of said trialkenyl isocyanurate or derivative thereof.

39. The process of claim 38, wherein said silicon hydride compound is selected from the group consisting of Si — $H_4$, $H_2$—$SiCl_2$, $(Cl_2.H—Si)_2.CH_2$, $(CH_3)_2.Si—H_2$, $C_6H_5.Si—H_3$, $C_6H_5.Si—H_2.(OC_2H_5)$, $(C_6H_5)_2.Si—H_2$, $C_5H_{11}.Si—H_3$, $CH_3(C_6H_5).Si—H_2$, dimethylpolysiloxane and methylpolysiloxane.

40. The process of claim 38, wherein said trialkenyl isocyanurate or derivative thereof is at least one member selected from the group consisting of triallyl isocyanurate, tricrotyl isocyanurate, trimethacryl isocyanurate, trichloropropenyl isocyanurate.

41. The process of claim 38, wherein said free radical polymerization catalyst is at least one member selected from the group consisting of dicumyl peroxide, acetylcyclohexylsulfonyl peroxide, isobutyl peroxide, butyl peroxide, lauroyl peroxide, benzoyl peroxide, di-tert-butyl peroxide, cumene hydroperoxide, diisopropylbenzene hydroperoxide, tert.butyl peroxybenzoate, and asobisisobutyronitrile.

42. The process of claim 38, wherein said addition polymerization catalyst is at least one member selected from the group consisting of a Lewis acid, an organic base, palladium-alumina, Raney nickel, platinum, a peroxide, ultraviolet ray, γ-ray, platinum black, platinized asbestos, platinum-silica gel, platinum-active carbon, platinum-alumina, chloroplatinic acid, a chloroplatinate, and a chloroplatinic acid complex salt.

43. A process for curing a thermally curable composition comprising (a) at least one silicon hydride compound represented by the formula:

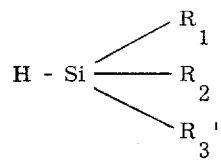

wherein $R_1$, $R_2$ and $R_3'$ are hydrogen, halogen, organic groups or organic silicon groups and at least one of $R_1$, $R_2$ and $R_3'$ is hydrogen or an organic silicon group containing at least one H — Si bond, (b) at least one trialkenyl isocyanurate or a derivative thereof represented by the formula,

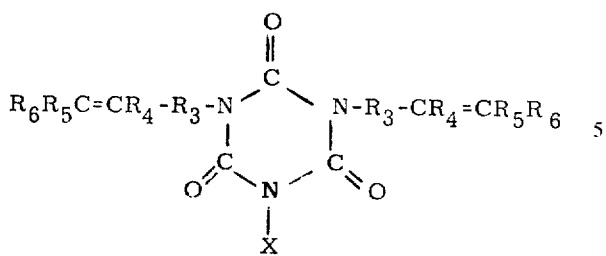

wherein X is —$R_3$—$CR_4$=$CR_5R_6$, alkyl, silylalkyl or aryl, $R_3$ is alkylene and $R_4$, $R_5$ and $R_6$ are hydrogen, halogen or alkyl, and (c) about $10^{-6}$ to $10^{-4}$ mole per equivalent of the H — Si groups in said silicon compound (a) of an addition polymerization catalyst, said process comprising heating said composition to a temperature of about 50° to 250°C., and thereafter adding to the composition so obtained about 0.2 to 5 % by weight of a free radical polymerization catalyst based on the combined weight of the composition so obtained and said free radical polymerization catalyst and then heating the mixture so obtained to a temperature higher than the decomposition temperature of the free radical polymerization catalyst.

44. The process of claim 43, wherein said composition contains about 0.2 to 1.2 equivalents of said silicon hydride for each equivalent of said trialkenyl isocyanurate or derivative thereof.

45. The process of claim 44, wherein said free radical polymerization catalyst is at least one member selected from the group consisting of dicumyl peroxide, acetylcyclohexylsulfonyl peroxide, isobutyl peroxide, butyl peroxide, lauroyl peroxide, benzoyl peroxide, di-tert-butyl peroxide, cumene hydroperoxide, diisopropylbenzene hydroperoxide, tert.-butyl peroxybenzoate, and azobisisobutyronitrile.

46. A polymer comprising the reaction product of (a) at least one silicon hydride compound represented by the formula:

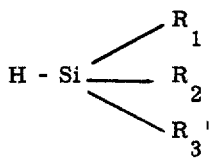

wherein $R_1$, $R_2$ and $R_3'$ are hydrogen, halogen, organic groups or organic silicon groups and at least one of $R_1$, $R_2$ and $R_3'$ is hydrogen or an organic silicon group containing at least one H — Si bond and (b) at least one trialkenyl isocyanurate or a derivative thereof represented by the formula,

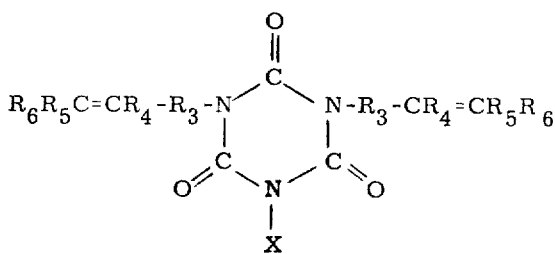

wherein X is —$R_3$—$CR_4$=$CR_5R_6$, alkyl, silylalkyl or aryl, $R_3$ is alkylene and $R_4$, $R_5$ and $R_6$ are hydrogen, halogen or alkyl, said polymer including polymer chains in which silicon hydride moieties and trialkenyl isocyanurate or derivative moieties are directly linked.

47. The polymer of claim 46, wherein said trialkenyl isocyanurate or derivative moieties contain pendant alkenyl groups.

48. The polymer of claim 47, wherein said polymer is obtained by reacting 0.2 to 1.2 equivalents of said silicon hydride compound for each equivalent of said trialkenyl isocyanurate or derivative.

49. The polymer of claim 48, wherein said silicon hydride compound is at least one member selected from the group consisting of Si—$H_4$, $H_2$—$SiCl_2$, ($Cl_2$.H—Si)$_2$.$CH_2$, ($CH_3$)$_2$.Si—$H_2$, $C_6H_5$.Si—$H_3$, $C_6H_5$.Si—$H_2$.(O$C_2H_5$), ($C_6H_5$)$_2$.Si—$H_2$, $C_5H_{11}$.Si—$H_3$, $CH_3$($C_6H_5$).Si—$H_2$, dimethylpolysiloxane and methylpolysiloxane.

50. The polymer of claim 49, wherein said trialkenyl isocyanurate or derivative is at least one member selected from the group consisting of triallyl isocyanurate, tricrotyl isocyanurate, trimethacryl isocyanurate, trichloropropenyl isocyanurate.

51. The polymer of claim 47, wherein said polymer contains copolymerized diallyl phthalate or vinylsiloxane.

* * * * *